United States Patent [19]
Thornton et al.

[11] Patent Number: 6,123,499
[45] Date of Patent: Sep. 26, 2000

[54] RECOVERY VEHICLE

[76] Inventors: George Thornton, 2 Red Row; Keith Thornton, 1 Red Row, both of Bedlington, Northumberland, NE22 7AB, United Kingdom

[21] Appl. No.: 09/180,318

[22] PCT Filed: May 2, 1997

[86] PCT No.: PCT/GB97/01220

§ 371 Date: Nov. 6, 1998

§ 102(e) Date: Nov. 6, 1998

[87] PCT Pub. No.: WO97/42053

PCT Pub. Date: Nov. 13, 1997

[30] Foreign Application Priority Data

May 7, 1996 [GB] United Kingdom ............. 9609453

[51] Int. Cl.⁷ .................................................. B60P 3/12
[52] U.S. Cl. .................................. 414/477; 414/480
[58] Field of Search ............................. 414/477, 478, 414/479, 480; 298/9

[56] References Cited

U.S. PATENT DOCUMENTS

| | | | |
|---|---|---|---|
| 2,621,072 | 12/1952 | Sherburne | 298/9 |
| 3,884,158 | 5/1975 | Rumell | 105/368 B |
| 4,470,746 | 9/1984 | DeLachapelle | 414/477 X |
| 5,011,362 | 4/1991 | Pijanowski | 414/480 |
| 5,263,807 | 11/1993 | Pijanowski | 414/480 |

Primary Examiner—Steven A. Bratlie
Attorney, Agent, or Firm—Larson & Taylor

[57] ABSTRACT

A recovery vehicle for rescuing stranded vehicles from confined or restricted areas includes a wheeled chassis (2, 6) on which is mounted a vehicle support body (40) movable by an hydraulic mechanism (44) between an inoperative position superimposed on the chassis (2, 6) and an operative position extending rearwardly of the chassis (2, 6). The vehicle support body (40) is rotatable about a vertical axis relative to the chassis (2, 6) by a primary hydraulic ram located substantially within the confines of the chassis (2, 6). The vehicle support body (40) also is pivotal on the chassis (2, 6) to engage the rear end of the vehicle support body on the ground when in its operative position. Such an arrangement enables recovery of stranded vehicles other than aligned with the recovery vehicle.

5 Claims, 6 Drawing Sheets

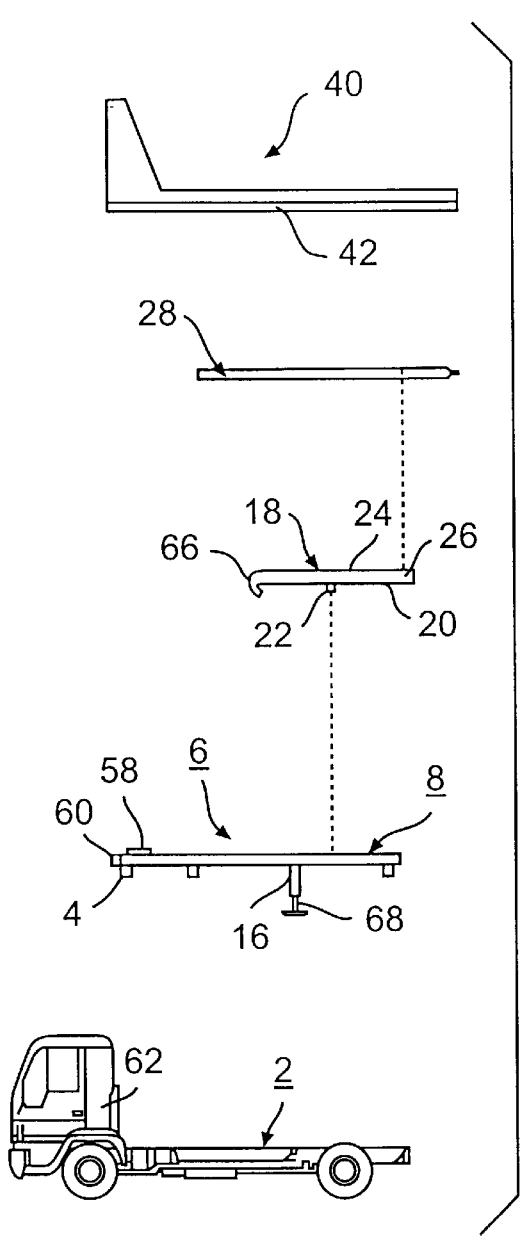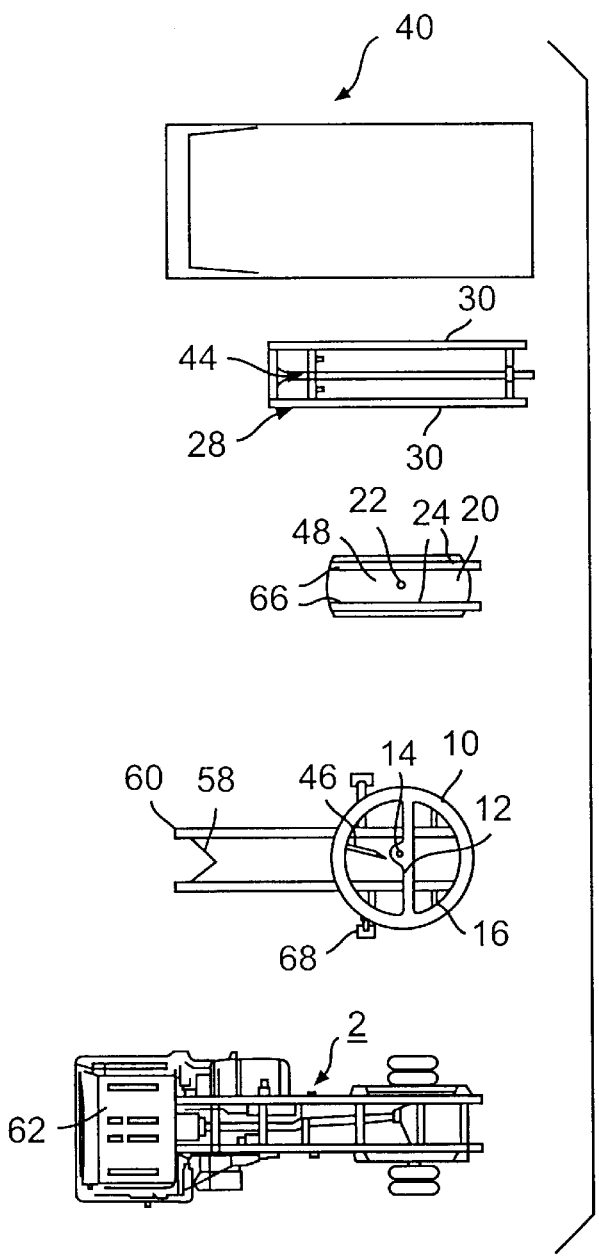
*FIG. 2a*  *FIG. 2b*

RECOVERY VEHICLE

TECHNICAL FIELD

This invention relates to recovery vehicles, and more particularly to such vehicles incorporating tilt and slide flat bed bodies to receive thereon stranded vehicles.

BACKGROUND

It is well established practice to provide a recovery vehicle incorporating a tilt and slide flat bed body the carrying surface of which can be slid rearwards relative to the chassis of the recovery vehicle and then tilted so that its rear end engages the ground whereby a stranded vehicle can be winched aboard. The body is then returned to its original position on the chassis with the stranded vehicle thereon.

Such arrangements suffer from the major disadvantage that stranded vehicles can only be recovered from positions directly behind the recovery vehicle, it being necessary to line up the recovery vehicle with the stranded vehicle prior to rescue. Thus recovery of vehicles stranded in narrow streets or restricted areas is often difficult.

It has been proposed, for example in EP-A-0087752, to mount the flat bed body on a turntable whereby the body can be lined up with stranded vehicles other than directly in line with the main chassis of the recovery vehicle.

However, the turntable mechanisms, which are usually driven by electric motors through intermeshing worms and gears, are of substantial height and weight, reducing the capacity of the recovery vehicle and extending above the main chassis of the recovery vehicle whereby the angle of approach of the stranded vehicle onto the extended flat bed body is steep.

SUMMARY OF THE INVENTION

It would be desirable to be able to provide a recovery vehicle incorporating a rotatable flat bed body, but in a more compact and lightweight manner than heretofore.

According to the present invention there is provided a recovery vehicle comprising a main chassis, a turntable mounted on the main chassis to be rotatable about a vertical axis, a vehicle support body mounted on the turntable and movable relative to the main chassis between an inoperative position superimposed on the main chassis and an operative position extending rearwardly of the main chassis, and means reacting between the main chassis and the turntable to rotate the vehicle support body said vertical axis, characterised in that the means reacting between the main chassis and the turntable comprises a first hydraulic ram the position of the line of action of which relative to the turntable can be altered whereby the vehicle support body can be selectively rotated in either direction about said vertical axis, the first hydraulic ram including a piston the free end of which is pivotally attached to the turntable, and a cylinder movable along an arcuate guide track, fixed relative to the main chassis, by means of a second hydraulic ram reacting between the main chassis and the cylinder of the first hydraulic ram, the arrangement being such that, on extension of the second hydraulic ram from a retracted position, the line of action of the first hydraulic ram is moved from a position extending to one side of a line interconnecting the free end of the piston of the first hydraulic ram and the vertical axis to a position extending to the other side of said line.

The main chassis may include a vehicle chassis and a subframe rigidly secured to the vehicle chassis, the turntable being mounted to the subframe and the first hydraulic ram reacting between the subframe and the turntable.

Such an arrangement enables the vehicle support body and the associated rotating mechanism to be provided as a unit for rigidly securing to the vehicle chassis of the recovery vehicle.

Conveniently the vehicle support body is mounted to the turntable by means of an intermediate subframe longitudinally fixed relative to said turntable but pivotal about a horizontal axis relative thereto, whereby the vehicle support body can be tilted relative to the turntable, the vehicle support body being movable horizontally relative to the intermediate subframe between its inoperative and operative positions.

Preferably the intermediate subframe is pivotal by means of a third hydraulic ram reacting between the turntable and the intermediate subframe, and the vehicle support body is movable longitudinally relative to the intermediate subframe by means of a fourth hydraulic ram reacting between the vehicle support body and the intermediate subframe.

Conveniently the first hydraulic ram is mounted to be confined substantially within the vertical extent of the main chassis.

In a preferred embodiment of the invention, the vehicle support body is mounted on a turntable, the turntable being mounted on the main chassis to be rotatable relative thereto about said vertical axis, the primary hydraulic ram reacting between the main chassis and the turntable.

The main chassis may include a vehicle chassis and a subframe rigidly secured to the vehicle chassis, the turntable being mounted to the subframe and the primary hydraulic ram reacting between the subframe and the turntable.

Such an arrangement enables the vehicle support body and the associated rotating mechanism to be provided as a unit for rigidly securing to the vehicle chassis of the recovery vehicle.

Conveniently the vehicle support body is mounted to the turntable by means of an intermediate subframe longitudinally fixed relative to said turntable but pivotal about a horizontal axis relative thereto, whereby the vehicle support body can be tilted relative to the turntable, the vehicle support body being movable horizontally relative to the intermediate subframe between its inoperative and operative positions.

Preferably the primary hydraulic ram is mounted to be confined substantially within the vertical extent of the main chassis.

The position of the line of action of the primary hydraulic ram can be altered whereby the vehicle support body can be selectively rotated in either a clockwise or an anticlockwise direction about said vertical axis.

Conveniently the primary hydraulic ram comprises a piston the free end of which is pivotally attached to the turntable and a cylinder mounted to the main chassis, said cylinder being movable relative to the main chassis to alter the line of action of the primary hydraulic ram relative to the vehicle support body.

Preferably the cylinder of the primary hydraulic ram is movable along an arcuate guide track, fixed relative to the main chassis, by means of a secondary hydraulic ram reacting between the main chassis and the cylinder of the primary hydraulic ram, the arrangement being such that, on extension of the secondary hydraulic ram from a retracted position, the line of action of the primary hydraulic ram is moved from a position extending to one side of said vertical axis to a position extending to the other side of said vertical axis.

BRIEF DESCRIPTION OF THE DRAWINGS

FIGS. 2a and 2b are, respectively, an exploded side view and an exploded plan view of a recovery vehicle according to the invention;

DESCRIPTION OF THE PREFERRED EMBODIMENT

Figure 1:
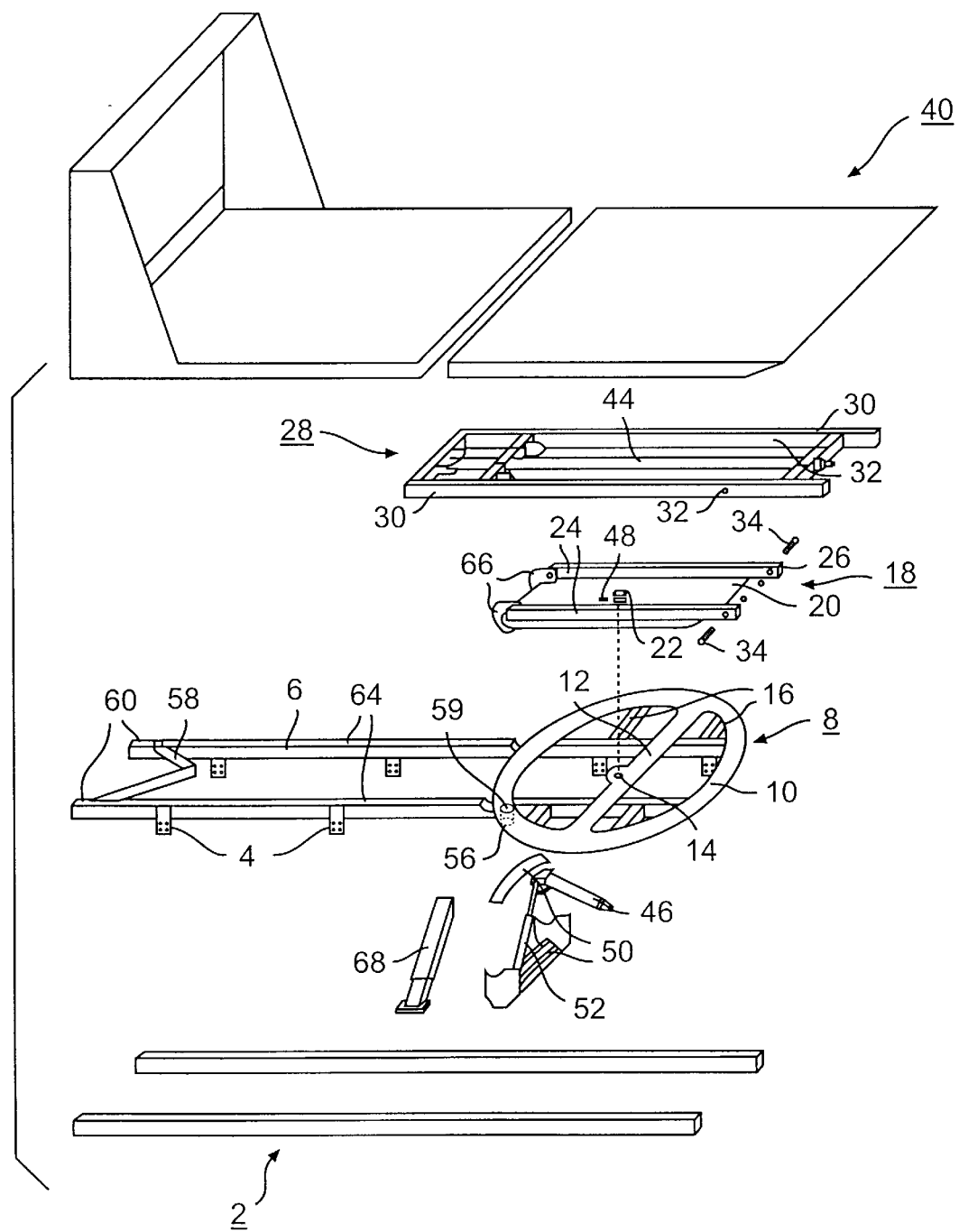
FIG. 1 is an exploded perspective view of a recovery vehicle according to the invention.

Referring to the drawings, the illustrated recovery vehicle comprises a wheeled chassis 2 to which is bolted, by way of brackets 4, a subframe 6 to constitute, together with the wheeled chassis 2, a main chassis to the vehicle.

Welded to the subframe 6 is a platform indicated generally at 8 and comprising an annular portion 10 and a diametrical member 12 provided with a central bearing 14 for reasons which will become apparent.

Strengthening beams 16 extend between the subframe 6 and the annular portion 10 to provide rigidity to the platform 8.

Mounted on the platform 8 is a turntable indicated generally at 18 and comprising a base plate 20 provided with a vertical stub axle 22 located in the bearing 14 whereby the turntable 18 can rotate relative to the platform 8 about a vertical axis.

Welded to the upper surface of the base plate 20 are a pair of parallel, hollow beams 24 one end of each of which is provided with a horizontal bore 26 therethrough.

Figure 3:
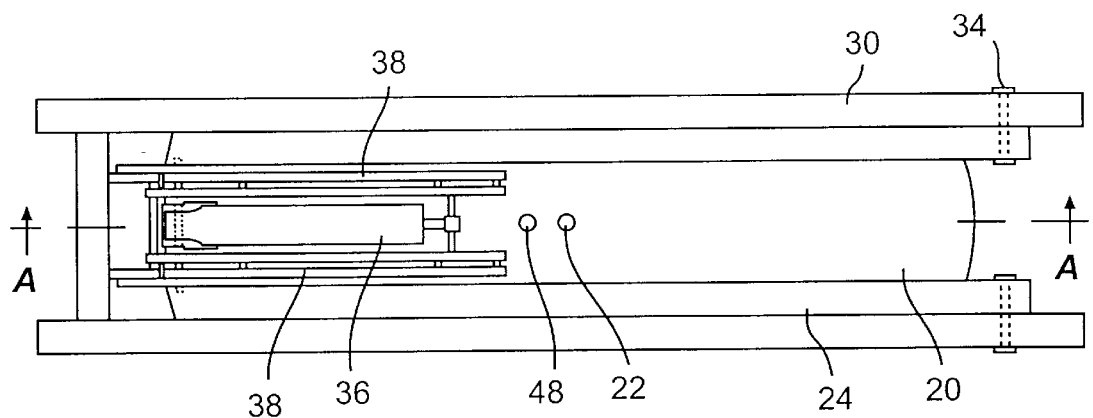
FIG. 3 is a plan view of the turntable and intermediate subframe of a recovery vehicle according to the invention with the subframe in a retracted position.
Figure 4:
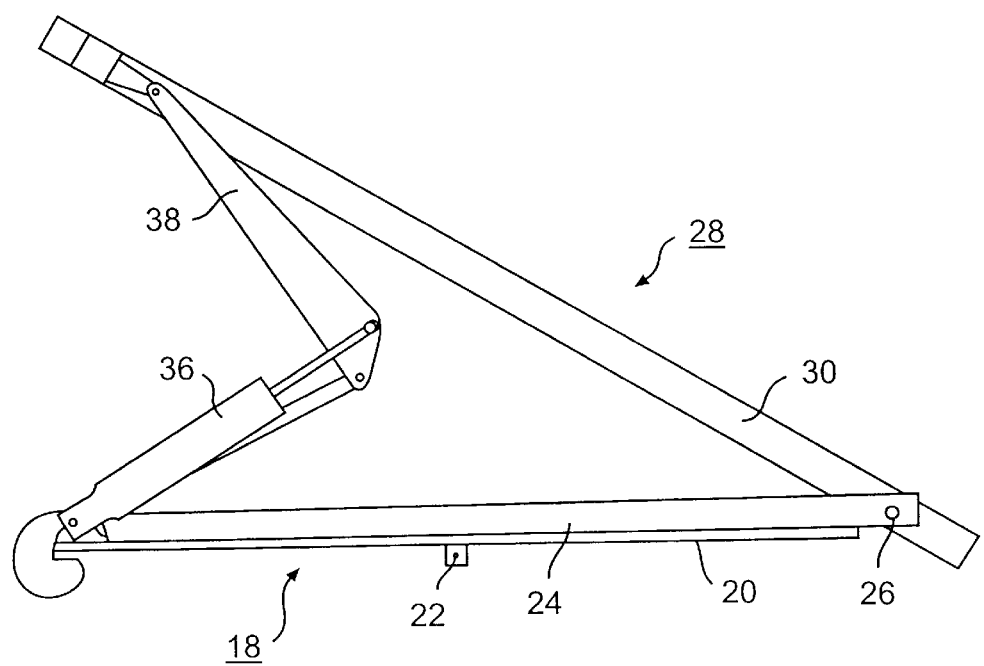
FIG. 4 is a section on line A—A of FIG. 3 with the subframe in an upwardly pivoted position.

An intermediate subframe indicated generally at 28 is mounted on the turntable 18 as best seen in FIGS. 3 and 4 to be rotatable with the turntable 18 but pivotal relative thereto. More particularly, the subframe 28 includes a pair of parallel members 30 located outwardly of and adjacent to the beams 24 of the turntable 18, and in which are formed horizontal bores 32, pivot pins 34 extending through the aligned bores 26, 32 of the members 30 and the beams 24 whereby the subframe 28 can be pivoted relative to the turntable 18.

This pivoting movement is achieved by way of an hydraulic ram 36 reacting between the turntable 18 and the subframe 28 through a series of links 38. Extension of the ram 36 raises the subframe 28 from the position shown in FIG. 2 to that shown in FIG. 4, and retraction of the ram returns the subframe to a position co-planar with the turntable 18.

A relatively conventional tilt and slide flat bed vehicle support body is indicated generally at 40 and is mounted on, to be slidable relative to, the intermediate subframe 28.

More particularly, the underside of the body 40 is provided with a pair of opposed, parallel, inwardly-open channel section members 42 which embrace the members 30 of the subframe 28 to be guided thereby for longitudinal sliding movement of the body 40 on the subframe 28.

This longitudinal movement is effected by means of an hydraulic ram 44 mounted longitudinally of the subframe 28 and reacting between the subframe 28 and the body 40.

The mechanism so far described is relatively lightweight, comprising primarily hollow box section beams, and is of relatively compact form with the turntable 18 and subframe 28 being located just above the main chassis 2,6, and the flat bed body 40 sliding on said subframe 28.

The turntable 18 and associated components are rotated by means of a single hydraulic ram 46 mounted within the confines of the main chassis and reacting between the subframe 6 and the underside of the base plate 20 of the turntable 18.

Figure 5A:
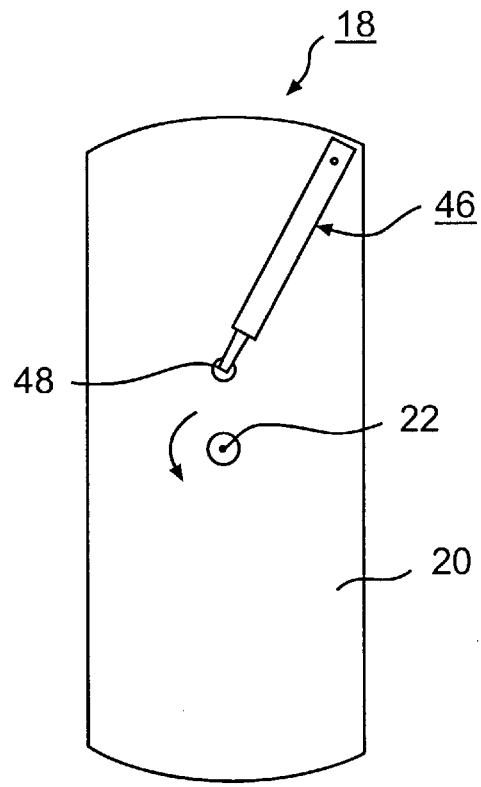
FIGS. 5a and 5b are schematic undersides plan views of the turntable of a recovery vehicle according to the invention with the first hydraulic ram in a retracted and an extended position respectively.
Figure 5B:
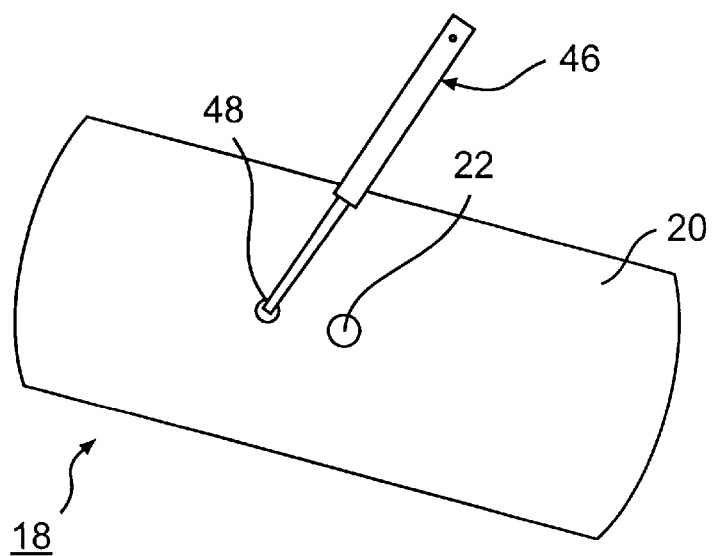

More particularly, the free end of the piston of the ram 46 is pivotally attached at 48 to the underside of the plate 20 at a point longitudinally displaced from the axis of rotation of the turntable 18 as best seen in FIGS. 5a and 5b.

Figure 6A:
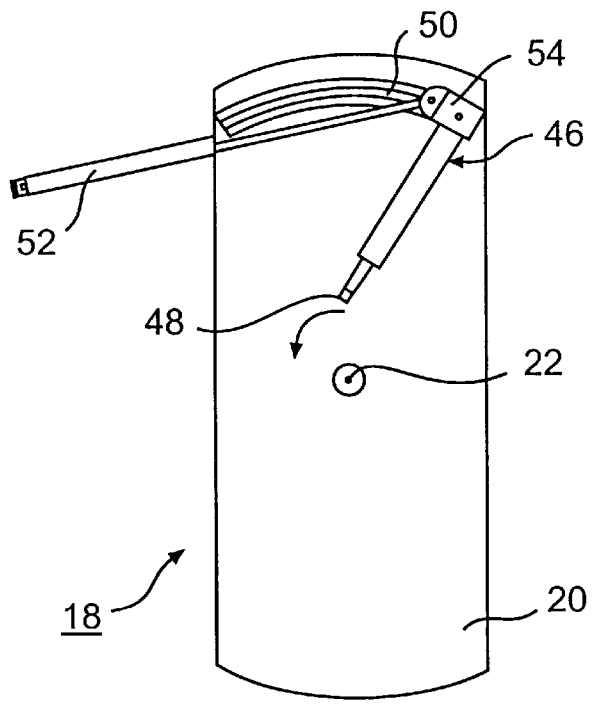
FIGS. 6a and 6b are schematic underside plan views similar to that of FIG. 5a but showing the second hydraulic ram in an extended position and a retracted position respectively.
Figure 6B:
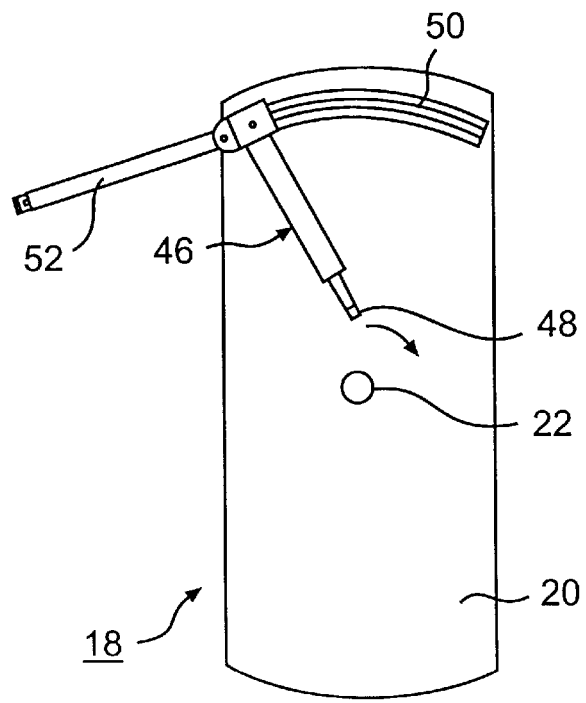

The free end of the cylinder of the ram 46 is mounted to an arcuate guide track 50 secured to the subframe 6 of the vehicle, the cylinder being movable along the track 50 and being securable to the track 50 at either end thereof in one or other of the positions shown in FIGS. 6a and 6b.

Movement of the cylinder of the ram 46 is effected by means of a further hydraulic ram 52 the free end of the piston of which is pivotally attached to a bracket 54 carrying the cylinder of the ram 46, the free end of the cylinder of the ram 52 being pivotally mounted to the underside of the platform 8 at 56, the ram extending through an aperture 59 in the subframe 6.

With the ram 52 in its extended condition as shown in FIG. 6a, extension of the ram 46 results in rotation of the turntable 18 in the direction of the arrow in FIGS. 5a and 6a to the position shown in FIG. 5b.

Retraction of the ram 52 to the condition shown in FIG. 6b moves the ram 46 to a position in which the line of action thereof extends to the other side of the axle 22 whereby extension of the ram 46 results in rotation of the turntable 18 in the direction of the arrow in FIG. 6b.

Catchment means (comprising V-shaped component 58 and lip components 60) are provided on the front of the subframe 6 for the body 40. These catchment means serve to guide the front of the body 40 into a central position on the chassis 2,6 to correct any operator misalignment when the body 40 is being reloaded onto the chassis 2,6, the V-shaped component 58 guiding the two members 42 into positions parallel with the chassis 2,6.

Furthermore, in the rest position of the body 40, the ends of the members 42 are clamped flat to the subframe 6 underneath lips provided by the components 60.

Before the body 40 can be rotated, it must be moved rearwards of the chassis 2,6 to disengage the members 42 from the lips of the components 60, thereby ensuring that the body 40, on rotation thereof, does not interfere with the cab 62 of the vehicle.

Flat plates 64 are welded to the top of each side member of the subframe 6 to compensate for the thickness of the platform 8 and whereby the upper surfaces of the subframe 6 and platform 8 are co-planar.

Figure 7:
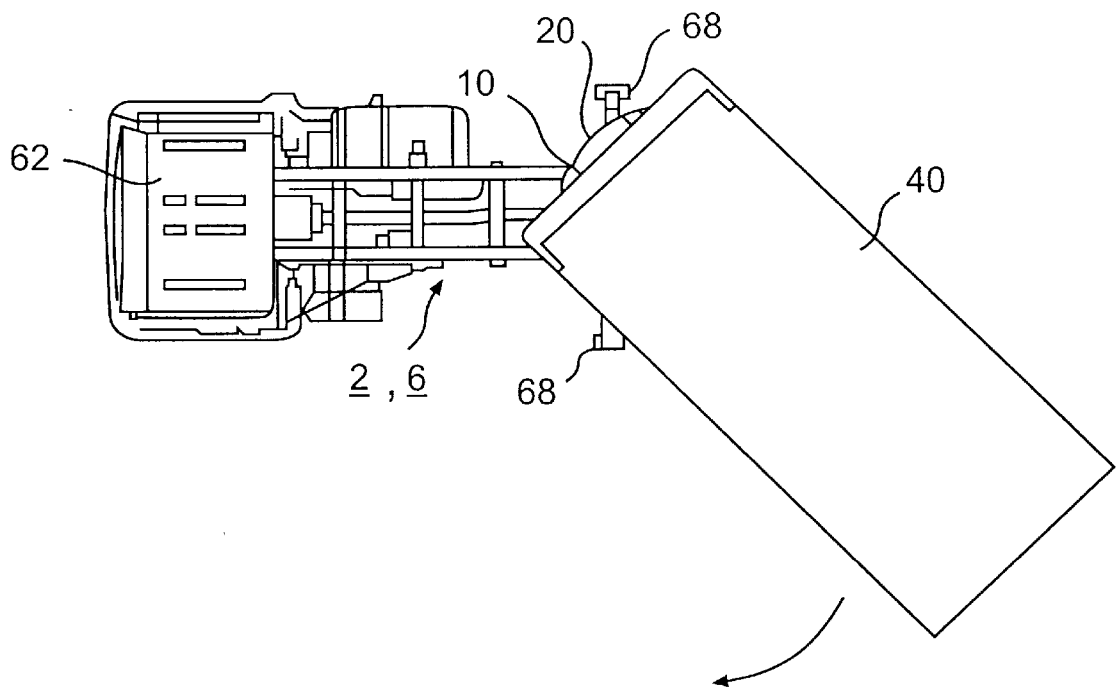
FIG. 7 is a plan view of a recovery vehicle according to the invention showing the vehicle support body in a partially rotated position.
Figure 8:
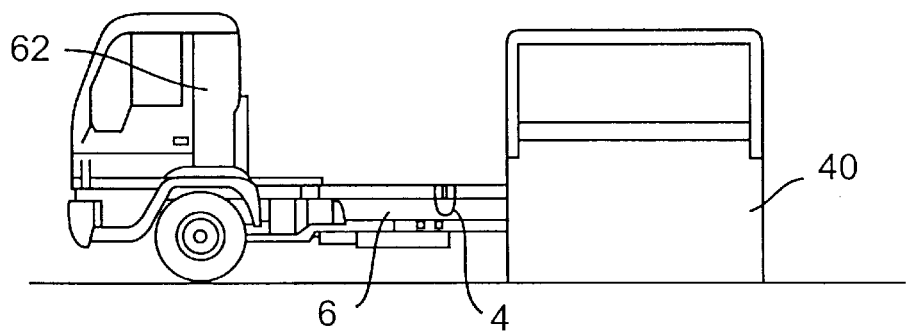
FIG. 8 is a side view of the vehicle of FIG. 7 showing the vehicle support body rotated through 90° and tilted to ground level.

As shown in FIG. 7, stabilizers 66 are provided on the forward end of the plate 20 of the turntable 18 to hook under the platform 8 to prevent the turntable 18 lifting away from the platform 8 on the application thereto of an asymmetric load as occurs when the body 40 is moved rearwardly of the vehicle.

Hydraulic stays 68 are provided to each side of the main chassis 2,6 for support purposes.

The described vehicle is used to recover a stranded vehicle as follows.

The recovery vehicle is maneuvered until the rear end thereof is adjacent the vehicle to be recovered and the stays 68 are lowered to the ground as shown in FIG. 7. The hydraulic ram 44 is then actuated to release the front of the body 40 from the catchment means and to move the body 40 rearwards on the chassis 2,6 to a fully displaced position thereon.

The ram 52 is actuated to locate the ram 46 in the appropriate position relative to the track 50 dependant upon the direction of rotation required to align the body 40 with the stranded vehicle, and said ram 46 is extended to rotate the body 40 to the selected angle relative to the chassis 2,6 as indicated by the arrow in FIG. 7.

The body 40 is then tilted by appropriate actuation of the ram 36 until the rear of the body 40 touches the ground adjacent the stranded vehicle, which can then be winched onto, and secured to, the body 40.

As with conventional recovery vehicles, the body 40 may include a spectacle lift or the like at its rear end to enable a second car to be carried thereby.

The body 40, together with the or each vehicle thereon, is remounted on the chassis 2,6 by reversing the above-described sequence of operations.

Thus there is provided a recovery vehicle capable of recovering stranded vehicles from narrow streets or restricted areas in which it is not possible to align the recovery vehicle with the vehicle to be rescued.

The flat bed body 40 of the described vehicle can be rotated through up to of the order of 90° to each side of the longitudinal axis of the vehicle, the rotating mechanism and the hydraulic rams for powering the same being of a relatively simple, compact nature, the latter being capable of being housed within the confines of the chassis of the vehicle, and the former protruding only slightly above the upper level of the chassis.

It will be appreciated that the flat bed body 40 and the associated mechanisms for controlled rotation thereof are all mounted on the subframe 6, and can therefore be secured as a unit on the vehicle chassis 2.

What is claimed is:

1. A recovery vehicle comprising a main chassis, a turntable mounted on the main chassis to be rotatable about a vertical axis, a vehicle support body mounted on the turntable and movable relative to the main chassis between an inoperative position superimposed on the main chassis and an operative position extending rearwardly of the main chassis, and rotation means reacting between the main chassis and the turntable to rotate the vehicle support body about said vertical axis, characterized in that the rotation means reacting between the main chassis and the turntable comprises a first hydraulic ram the position of a line of action of which relative to the turntable can be altered whereby the vehicle support body can be selectively rotated in either direction about said vertical axis, the first hydraulic ram including a piston the free end of which is pivotally attached to the turntable, and a cylinder movable along an arcuate guide track fixed relative to the main chassis by a second hydraulic ram reacting between the main chassis and the cylinder of the first hydraulic ram, the arrangement being such that, on extension of the second hydraulic ram from a retracted position, the line of action of the first hydraulic ram is moved from a position extending to one side of a line interconnecting the free end of the piston of the first hydraulic ram and the vertical axis to a position extending to the other side of said line.

2. A recovery vehicle as claimed in claim 1 in which the main chassis includes a vehicle chassis and a subframe rigidly secured to the vehicle chassis, the turntable being mounted to the subframe and the first hydraulic ram reacting between the subframe and the turntable.

3. A recovery vehicle as claimed in claim 2 in which the vehicle support body is mounted to the turntable by means of an intermediate subframe longitudinally fixed relative to the turntable but pivotal about a horizontal axis relative thereto, whereby the vehicle support body can be tilted relative to the turntable, the vehicle support body being movable longitudinally relative to the intermediate subframe between its operative and inoperative positions.

4. A recovery vehicle as claimed in claim 3 in which the intermediate subframe is pivotal by means of a third hydraulic ram reacting between the turntable and the intermediate subframe, and the vehicle support body is movable longitudinally relative to the intermediate subframe by means of a fourth hydraulic ram reacting between the vehicle support body and the intermediate subframe.

5. A recovery vehicle as claimed in claim 1 in which the first hydraulic ram is mounted to be confined substantially within the vertical extent of the main chassis.

* * * * *